US006080261A

United States Patent [19]
Popat et al.

[11] Patent Number: 6,080,261
[45] Date of Patent: Jun. 27, 2000

[54] ADHESIVE IMAGE TRANSFER TECHNIQUE

[76] Inventors: Ghanshyam H. Popat, 10365 Bristol Dr., Alta Loma, Calif. 91701; Fred Miekka, 234 San Gabrel Ct., Sierra Madre, Calif. 91024; Raymond G. Kubit, 4365 Smoketree Ave., Yorba Linda, Calif. 92686; Robert Valadez, 231 O'Malley St., Azusa, Calif. 91702

[21] Appl. No.: 08/892,187

[22] Filed: Jul. 14, 1997

Related U.S. Application Data

[63] Continuation-in-part of application No. 08/519,570, Aug. 25, 1995, abandoned, and a continuation-in-part of application No. PCT/US96/13908, Aug. 26, 1996.

[51] Int. Cl.[7] .......... B32B 31/04

[52] U.S. Cl. .......... 156/240; 156/230; 156/239; 156/249; 156/277

[58] Field of Search .......... 156/230, 236, 156/239, 240, 247, 249, 277; 428/40.2, 41.7, 41.8, 42.1, 195, 200, 343, 347, 348, 349, 350, 352, 354, 914, 915

[56] References Cited

U.S. PATENT DOCUMENTS

| | | | |
|---|---|---|---|
| 3,441,430 | 4/1969 | Peterson . | |
| 4,068,028 | 1/1978 | Samonides | 156/277 X |
| 4,171,398 | 10/1979 | Hunt | 156/240 X |
| 4,413,080 | 11/1983 | Blake . | |
| 4,636,805 | 1/1987 | Toganoh et al. . | |
| 4,732,786 | 3/1988 | Patterson et al. . | |
| 4,812,541 | 3/1989 | Mallya et al. . | |
| 5,027,131 | 6/1991 | Hasegawa et al. . | |
| 5,320,885 | 6/1994 | Yamane et al. . | |
| 5,326,644 | 7/1994 | Scholz et al. . | |
| 5,407,718 | 4/1995 | Popat et al. | 428/343 X |
| 5,501,902 | 3/1996 | Kronzer . | |
| 5,640,180 | 6/1997 | Hale et al. . | |
| 5,659,972 | 8/1997 | Min et al. . | |
| 5,672,413 | 9/1997 | Taylor et al. | 428/195 |
| 5,686,504 | 11/1997 | Ang . | |
| 5,795,425 | 8/1998 | Brault et al. | 156/277 X |
| 5,827,389 | 10/1998 | Takizawa et al. | 156/234 |

FOREIGN PATENT DOCUMENTS

| | | |
|---|---|---|
| 649753A1 | 4/1995 | European Pat. Off. . |
| 775596A1 | 5/1997 | European Pat. Off. . |
| 782931A1 | 7/1997 | European Pat. Off. . |
| 2 715 607 | 8/1995 | France . |
| 06286325 | 10/1994 | Japan . |
| 09240196 | 9/1997 | Japan . |
| 9506564 | 3/1995 | WIPO . |
| WO 96/26840 | 9/1996 | WIPO . |
| 97/07991 | 3/1997 | WIPO . |
| 9707991 | 3/1997 | WIPO . |

OTHER PUBLICATIONS

International Preliminary Examination Report, Appl. No. PCT/US96/13908, Oct. 22, 1997.

*Primary Examiner*—Curtis Mayes

[57] ABSTRACT

An ink jet printer image transfer sheet having a non-porous flexible base layer, an ink absorbing adhesive layer coated onto said base layer and an ink jet printing ink porous detackifying outer layer. A method for transferring an ink jet printed image to a substrate.

22 Claims, 3 Drawing Sheets

ADHESIVE IMAGE TRANSFER TECHNIQUE

RELATED PATENT APPLICATIONS

This application is a continuation-in-part of U.S. application Ser. No. 08/519,570, filed Aug. 25, 1995, now abandoned. This application is also a continuation-in-part of Patent Cooperation Treaty Application No. PCT/US96/13908, which designated the United States and which was filed on Aug. 26, 1996.

FIELD OF THE INVENTION

This invention relates to the transferring of images.

BACKGROUND OF THE INVENTION

Many arrangements for the transfer of images from ink jet printers are known. For example, images, including printing, may be printed onto labels having pressure sensitive adhesive on the labels, and these labels may be applied to a desired substrate, such as a bottle or other product.

SUMMARY OF THE INVENTION

In accordance with the present invention, it has been determined that some unique benefits may be obtained by imaging onto an adhesive layer, coated on an opaque or transparent plastic sheet, such as Mylar, or a paper liner, as a base layer, using an ink jet printer.

A conventional ink jet printer is employed to apply an ink image, preferably a colored image, to the adhesive layer of an image transfer sheet, the adhesive layer having been coated onto a base layer which is preferably flexible and nonporous to an ink jet printer ink. The non-porous flexible layer may be a sheet of plastic which can be either opaque or transparent, or formed of the usual type of label liner material, such as calendered paper coated with a thin layer of silicone.

The adhesive layer is compatible with and will absorb an ink jet printing ink. Most inks used in ink jet printers are water based but such inks may also be based on organic solvents or carriers for the ink dyes and/or pigments. Thus, depending upon the ink used in the ink jet printer, the adhesive layer may be either hydrophilic or hydrophobic. Since, as noted above, most ink jet printing inks are water based, it is generally preferable if the adhesive coating or layer, at the time of imaging, is hydrophilic and will absorb the water-based ink.

Water-based inks for ink jet printers are well-known in the art and therefore no detailed exemplification thereof will be given herein. These water-based inks contain a sufficient amount of water to be the carrier for the dyes and/or pigments in the ink. Of course, a water-based ink jet printing ink may contain water-miscible organic liquids such as polyhydric alcohols which are often present in water-based inks to prevent clogging of the nozzles. The inks may also contain a variety of other compounds such as surfactants, etc.

At the time of printing the ink on and into the adhesive layer to form an image, the adhesive layer should be detackified by the use of an inactivatable detackifying layer. After the adhesive layer is imaged, it will then be activated (or the detackifying layer may be inactivated), i.e. the adhesive layer tackified to a tacky state, and adhered or bonded to any desired substrate such as a ring binder, clothing, notebook cover, a glass window, a wall or anywhere it is desired to view the image. In this regard, it should be noted that if the image is placed or adhered to a non-transparent substrate, and the base layer is not transparent, the adhesive layer should be releasably bonded to the base layer or liner so that the base layer can be removed to allow the image to be seen by a viewer. From the foregoing, it is apparent that the image is viewable from both the lower surface (i.e. the surface facing the base layer) and the upper surface (i.e. the surface facing away from the base layer) of the adhesive coating or layer.

The ink absorbing adhesive layer used in the present invention may be pressure sensitive, particularly hydrophilic pressure sensitive adhesives. Such adhesives are known in the art and include repulpable pressure sensitive adhesives such as those disclosed in U.S. Pat. Nos. 5,196,504 and 5,326,644, such disclosures being incorporated herein by reference. The adhesives disclosed in these patents are water-dispersible and tacky at room temperature which make them ideal for use in the present invention. Of course, other pressure sensitive emulsion adhesives are also known in the art and they too are suited for use in the present invention.

If an adhesive is used which is tacky at the time when it is imaged, the adhesive may be detackified by providing the imaging transfer sheet with an outer detackifying layer over the upper surface of the adhesive coating. Such a detackifying layer will be transmissive to the imaging ink so that a sufficient amount of ink will pass through the porous detackifying layer to the adhesive layer to allow an image to be formed therein. Generally speaking, the detackifying layer will permit at least 30 percent and preferably more (e.g. 40 percent) of the ink jet printing ink to pass into the adhesive layer and form an image.

Various types of porous or ink transmissive detackifying layers may be used. For example, a mesh coating such as cheesecloth may be used, preferably with a very thin layer of release material such as silicon between the mesh layer and the adhesive, preferably coated on the mesh before it is applied to the adhesive so that the mesh layer may be more readily removed. It is emphasized that the silicon layer does not cover the pores of the mesh thereby allowing the ink to pass through the pores of the mesh and into the pressure sensitive adhesive. Other mesh materials having finer strains and being less coarse than cheesecloth may be employed. Even paper may be employed since it is porous to the ink.

Other inactivatable, ink transmissive, or porous detackifying outer layers which are useful in the present invention may be formed from finely divided particles uniformly dispersed on and bonded to the surface of the tacky adhesive layer. Examples of such particles are cellulose particles and dextrin particles. It is preferred that the finely divided particles have the shape of round spheres as is the case with starch particles (e.g. corn or potato starch) and powdered polyvinyl alcohol. Such porous layers are advantageous used with a pressure sensitive adhesive which, when heated, becomes sufficiently viscous that when pressure is applied the particles are dispersed into the adhesive layer, thus allowing the tacky adhesive layer to contact and adhere to a suitable substrate. If the finely divided particles have substantially the same refractive index as the adhesive layer (e.g. starch particles and polyvinyl alcohol particles), the particles are not seen by a viewer and thus disappear. Exemplary of pressure sensitive adhesives which are well suited for use with the finely divided particles are repulpable adhesives as described in the patents cited above. It should be noted that polyvinyl alcohol (whether in the form of round spheres or in the form of a layer) is normally not tacky when dry, but is permeable to water and transmissive to the ink, so that the ink jet image is readily absorbed into the PVA coated pressure sensitive adhesive. Where this detackifying coating is used, it is desirable to wet or at least dampen the substrate to which the image is subsequently applied, or the PVA surface, and this serves to activate the adhesive and have the PVA combine therewith.

It is also noted that a release layer may be employed between the adhesive and the non-porous, flexible, preferably transparent, backing sheet, so that the backing sheet may be removed. When a hydrophilic adhesive is used and the image sheet is adhered to a window, for example, it may be washed off by first removing the transparent plastic sheet or paper liner and then washing with soap and water in a normal manner, when a water soluble detackifying layer is used.

In some other cases, it may also be desirable to remove the transparent plastic layer, which may be mylar, for example, so that the image in the adhesive appears brighter; and an additional transparent detackifying layer, which may be polyvinyl alcohol or starch, may be used between the release layer and the pressure sensitive adhesive to eliminate the surface stickiness or tackiness of the adhesive, which would otherwise be directly exposed. If a semi-permanent or permanent image is desired, the additional detackifying layer may be water insoluble, formed of a transparent acryllic polymer, or a rubber based transparent material, or other permanent non-soluble coating.

It is also noted that the pressure sensitive adhesive layer may be a delayed action, heat activated pressure sensitive adhesive wherein the pressure sensitive adhesive properties arise following heating and have a predetermined open tack time for adhering to surfaces, and then become non-tacky. When such a pressure sensitive layer is employed, a detackifying layer would not be needed. Examples of such adhesives include acrylates and ethylene vinyl acetate.

In accordance with another aspect of the invention, the upper layer of the image sheet may be a water activatable adhesive, e.g. a mixture of polyvinyl alcohol (PVA) and polyacrylic acid. This adhesive may be coated onto the flexible base layer, with an intermediate release coating, if desired. The resulting image transfer sheet is non-tacky when dry. However, the upper adhesive layer is hydrophilic, and will absorb an image from a conventional ink jet printer. When it is desired to apply the image to a substrate, either the image sheet or the substrate, such as a window, may be sprayed or dampened with water to activate the adhesive so that the image sheet will adhere to the substrate.

Other objects, features and advantages of the invention will become apparent from a consideration of the following detailed description and from the accompanying figures.

DETAILED DESCRIPTION OF THE PREFERRED EMBODIMENTS

Figure 1:
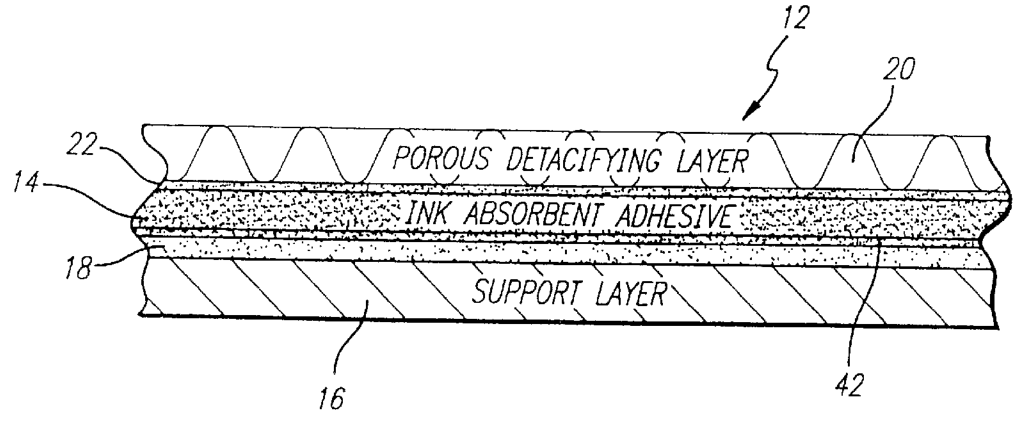
FIG. 1 is a schematic cross-sectional view of an imaging sheet illustrating the principles of the present invention.

Referring now to the figures, FIG. 1 is a cross sectional view of an imaging sheet 12 in which the image is held in an ink absorbent pressure sensitive adhesive layer 14. The imaging sheet 12 may be provided with a support layer 16 which is preferably transparent and may be formed of a plastic material such as Mylar. The Mylar layer 16 may, for example, have a thickness of between about one-half of one thousandth of an inch to about 0.003 inch. Coated on the support layer 16 is a release layer 18 which is normally a material such as silicone, having a thickness of about $1/10$ of a mil, or about 0.0001 inch. An optional detackifying layer 42 such as polyvinyl alcohol may be provided, having a thickness of about from 0.5 to 1.5 mils. The pressure sensitive adhesive layer 14 may, for example, have a thickness of between ½ and 2 mils. A detackifying layer 20 is provided at the upper surface of the imaging sheet 12, and this layer may be a porous screen material, such as a cheese cloth or a fine open mesh, or may be starch or polyvinyl alcohol. To facilitate removal of the porous layer 20, it may be sprayed with a release coating 22 prior to its application to form the complete composite imaging sheet 12. The mesh screen may, for example, be from 1 to 5 mils thick, and the release layer may, again, be formed of silicone and is a very thin coating in the order of one ten thousandth of an inch in thickness.

Figure 2:
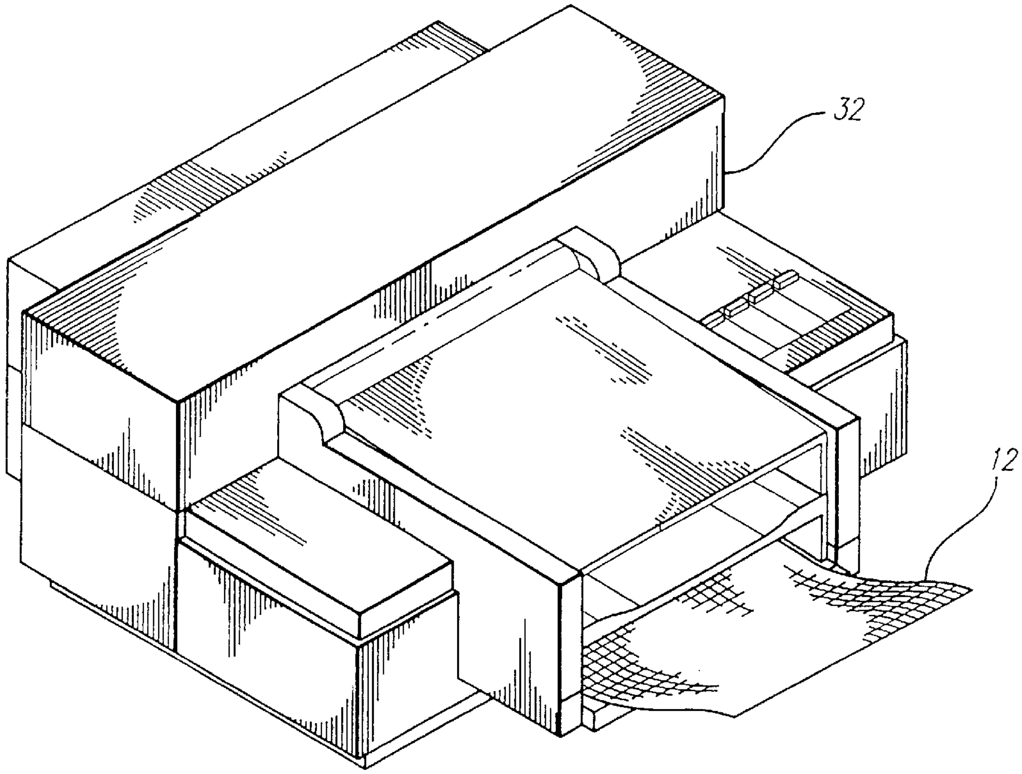
FIG. 2 shows an ink jet printer receiving an imaging sheet of the type shown in FIG. 1.

FIG. 2 of the drawings shows a conventional ink jet printer 32 through which the composite imaging sheet 12 is being fed. Incidentally, the mesh as shown in FIG. 2 on the imaging sheet 12 is shown as being much coarser than the mesh or screen would actually be in practice. For example, the mesh or screen could have transverse threads spaced in the order of a thousandth or a few thousandths of an inch apart in each direction, rather than the very coarse mesh as shown in FIG. 2.

Figure 3:
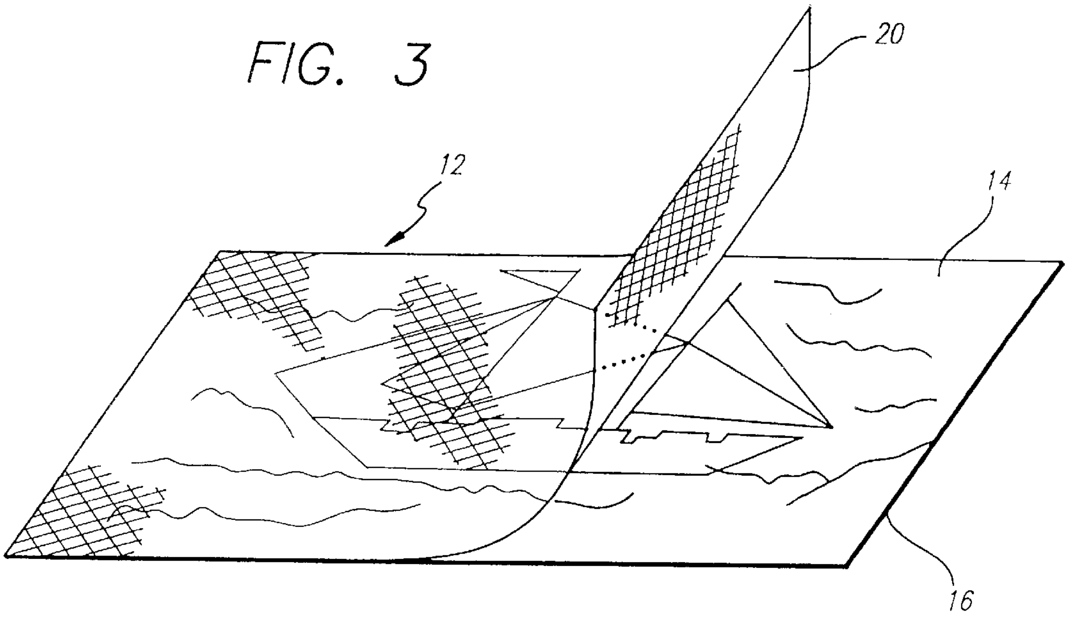
FIG. 3 shows a sheet illustrating the principles of the invention in which a porous screen is being removed.

Referring now to FIG. 3 of the drawings, the mesh 20 is in the process of being removed, and the imaged pressure sensitive adhesive layer 14 will then be on the upper surface of the sheet 12. The adhesive layer 14 will still be supported by the underlying plastic sheet, as indicated by the reference numeral 16.

Figure 4:
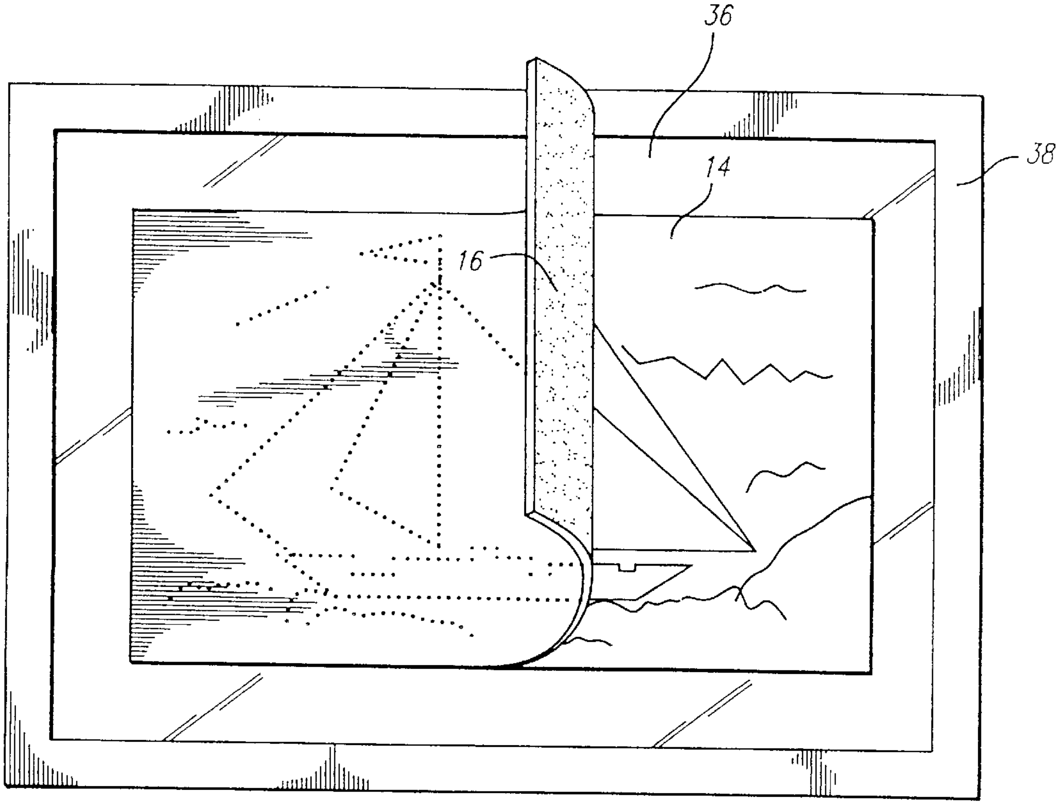
FIG. 4 shows the image sheet of FIG. 3 mounted on a transparent substrate, such as a window, and in the process of having the support layer peeled off.

FIG. 4 is a schematic showing of the pressure-sensitive adhesive layer 14 mounted on a sheet of glass 36 shown in a frame 38 which could, for example, be a window frame in which the sheet of glass 36 is mounted. In FIG. 4, the transparent sheet 16 is shown being removed. In this regard, it is noted that the image in the pressure-sensitive adhesive layer 14 is clearly visible from the other side of the glass, but is less clear when it has to be viewed through the Mylar layer 16. Accordingly, in order to more clearly view the image in the layer 14, the protective substrate or transparent plastic layer 16 may be removed, once the sheet has been adhered to the glass 36. In addition, following the removal of the layer 16, which may serve as a protection against moisture for the hydrophilic layer 14, the entire window may be readily washed clean with soap and water.

Incidentally, following removal of the protective layer 16, it is sometimes preferred that the pressure sensitive adhesive layer 14 not be sticky, or tacky.

Accordingly, as shown in FIG. 1, an additional detackifying layer 42 may be provided. This detackifying layer may, for example, be polyvinyl alcohol. With this layer in place, when the base layer 16, as shown in FIG. 4, is removed, the image bearing pressure-sensitive layer 14 will not be directly exposed, and therefore will not feel tacky.

Figure 6:
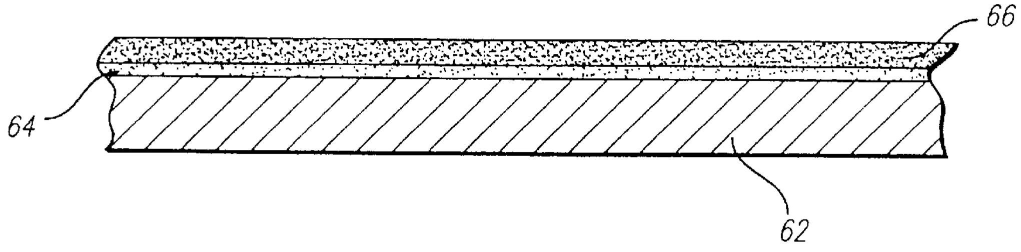
FIG. 6 shows an embodiment of the invention in which a water activated adhesive imaging layer is employed.

As an alternative to the use of pressure sensitive material having normal, fairly long lasting adhesive properties, a delayed action heat activated pressure sensitive adhesive may be employed. One such adhesive is available from the Nashua Company of Nashua, N.H. under the trade designation number BM-4. Inks for use with this adhesive should have a polar solvent or carrier, such as methylethyl ketone. Such adhesives are heat activated and have an open sealing or adhesive time period during which they may be applied to a substrate, and thereafter they become non-tacky. When such adhesives are used, the additional detackifying layer 42 is not needed, and a simplified overall construction as shown in FIG. 6 may be used.

Concerning the various layers of FIG. 1, the basic components of the sheet 12 include the support layer 16, the ink absorbing pressure-sensitive adhesive layer 14, and a detackifying layer 20. Concerning the release layer 18 and the detackifying layer 42, these will not be included in the sheet in the event that it is not desired to remove the transparent support layer 17. In addition, in some cases, the release layer 22 may not be needed, when the mesh can be peeled off the adhesive layer without release layer 22, or when a different type of detackifying layer, as disclosed hereinbelow, is employed.

Also, instead of a hydrophilic adhesive for the pressure-sensitive adhesive layer 14, other types of pressure-sensitive adhesives may be employed for use in connection with an organic solvent based ink, which will be absorbed by, and permit an image to penetrate the particular pressure-sensitive adhesive which is used.

For specific examples, solvent cast acrylic pressure sensitive adhesives or hot melt pressure sensitive acrylic adhesives may be used. For such adhesives, inks having relatively polar solvents such as normal butyl alcohol or methylethyl ketone are preferred. Rubber based pressure sensitive adhesive such as Avery S-246 may be employed with inks in relatively low polarity solvents such as heptane or toluene.

Figure 5:
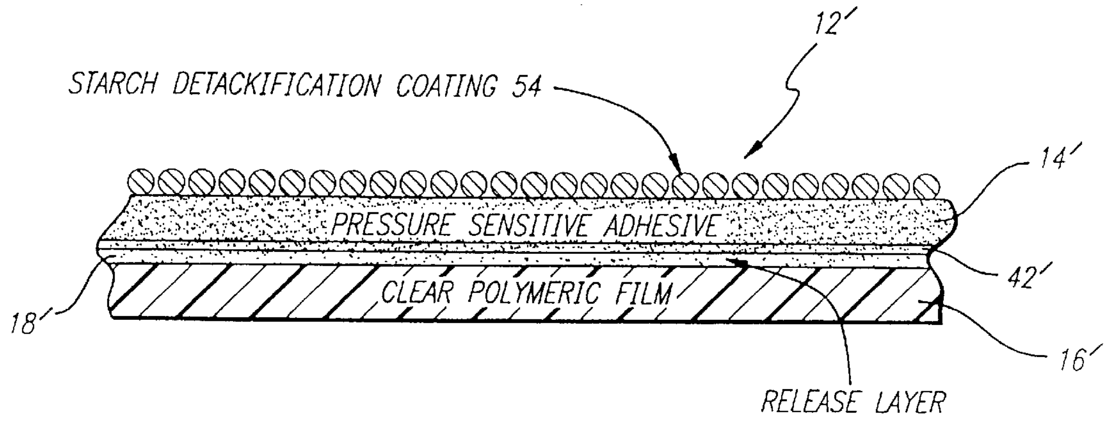
FIG. 5 shows a further embodiment of the invention in which a coating of starch is employed as the detackification coating.

Referring now to FIG. 5 of the drawings, FIG. 5 shows a sheet 12'. In FIG. 5, the base or support layer 16', the release layer 18', the detackifying layer 42', and the ink absorbing pressure sensitive adhesive layer 14' are as described hereinabove.

However, instead of a mesh type detackifying layer at the upper surface, FIG. 5 discloses the use of starch particles as the detackifying coating 54. When a starch detackifying layer 54 is employed, heat and pressure are employed to combine the starch layer with the adhesive and therefore activate the adhesive layer 14" so that it is tacky and will stick to whatever surface is employed. As noted previously, the starch particles have substantially the same refractive index as the adhesive and therefore when combined with (dispersed in) the adhesive the particles cannot be seen.

Referring again to FIG. 1 of the drawings, the detackifying layer may be a very thin layer of polyvinyl alcohol (PVA), preferably a fraction of thousandth of an inch thick, or even about 0.0001 inch thick. PVA is non-tacky when dry, but is hydrophilic so that an applied ink jet image will penetrate through to the underlying hydrophilic adhesive layer. As the image sheet is applied to a substrate the substrate or the image sheet is dampened, and the very thin layer of PVA combines with the pressure sensitive adhesive and a good adhesive bond is obtained between the imaged pressure sensitive adhesive and the substrate.

Now, turning to FIG. 6 of the drawings, a relatively simple embodiment of the invention includes the base layer 62, a thin release coating 64, and a water activatable adhesive layer 66. Layer 66 may be a few thousandths of an inch thick, for example, 0.002 to 0.005 inch thick. The water activated adhesive layer 66 may be formed of polyvinyl alcohol (PVA) and polyacrylic acid. It may be applied as an aqueous solution including about 10 percent solids, with approximately 75% PVA and 25% polyacrylic acid. The coating is non-tacky when dry. However, it is hydrophilic, and accepts a good image from an ink-jet printer. Following imaging the image sheet may, for example, be adhered to a substrate, such as a window which has been sprayed with water, so that when the image sheet is applied to the wet window the adhesive is activated, and the image sheet is adhered to the window. Thereafter, the base layer may be peeled off, leaving the imaged adhesive layer on the substrate.

Concerning the non-porous flexible base layer, as mentioned above, it may be formed of any of the usual label liner materials, such as paper coated with a thin coating of silicone, and such paper may, for example be supercalendered, and have a thickness in the order of two or three thousanths of an inch. Concerning another aspect of the present invetnion, reference is made to U.S. Pat. No. 5,407,718 entitled "Transparent Paper Label Sheets," which was noted by the Patent Office in connection with the parent patent application. This patent discloses a label which includees a conventional base liner, an acrylic pressure sensitive adhesive and transparent label face stock material. When the label material is printed in an ink jet printer, virtually all of the ink is absorbed in the transparent label material and virtually no ink passes through the label material. In use, the liner may be removed and the face stock label material secured to a supporting surface by the pressure sensitive adhesive, which faces the supporting surface with the face stock outside in the normal manner of using pressure sensitive labels. The acryllic prssure sensitive adhesive as disclosed in this patent is hydrophobic and no significant amount of ink reaches or penetrates the adhesive. This mode of operation is far different from that of the present invention, in which the image is formed in the adhesive, and in which the side of the assembly away from the liner is secured to a supporting surface, and the liner may optionally be removed or left in place. In accordance with the present invention an inactivatable porous detackifying layer is employed over the adhesive layer, the image is formed in the adhesive, which is receptive to the ink jet printer fluid applied through the porous layer, and the detackifying layer is inactivated so that the imaged adhesive layer may be applied to a final supporting structure, with the liner on the outside. The liner may then be removed, or left intact depending on the transparency of the supporting structure and the liner.

As to dimensions and supplementing those previously provided herein, the backing 16 and release coating 18 together are typically between 0.5 mil and 10 mils thick, and preferably between 3 and 5 mils. The lower detack layer 42 is typically between 0.10 and 10 mils thick, and preferably between 0.5 and 3 mils. The pressure sensitive adhesive layer 14 is typically between 0.5 and 8 mils, and preferably between 1 and 3 mils. The upper detack layer 20 is typically between 0.05 mils and 3 mils, and preferably between 0.05 and 0.3 mils, and the detack layer 20 may be porous or dissolving.

In the foregoing detailed description, preferred embodiments of the invention have been disclosed, and it has been determined that successful images may be formed in adhesive layers, using a conventional ink jet printer. However, various modifications and changes may be employed without departing from the spirit and scope of the invention. Thus, as described hereinabove, instead of using hydrophilic or repulpable adhesives, hydrophobic pressure sensitive adhesives, or heat activated, or water activated adhesives, may be employed as the imaging layer, with appropriate ink solvents so that the ink will penetrate this imaging adhesive layer. Also, instead of Mylar, other transparent plastic or opaque layers may be employed as the support layer. For the outer detackifying layer, a very fine metallic or cloth mesh with an open weave may be employed; and other substances having comparable properties may be substituted for those mentioned hereinabove. It is also noted that the ink jet absorbing layer may be detackified relative to the ink jet printer by applying strips of paper with a silicone coating facing the adhesive, and with the longitudinally extending strips of paper matched to the spacing of the drive wheels of the ink jet printer; and the adhesive layer may be fully activated following application of an ink jet image to areas of the adhesive layer not covered by the strips, by peeling off the strips. Accordingly, the present invention is not limited precisely to the arrangements as shown in the drawings and as described in detail hereinabove.

What is claimed is:

1. An ink jet printing image transfer method comprising:

forming an image transfer sheet including (a) a flexible base layer which is substantially impermeable to ink jet ink, (b) an ink jet printing ink-absorbing adhesive layer that is coated onto said base layer, and (c) an inactivatable detackifying outer layer, said detackifying layer being transmissive to ink jet ink and, permitting at least 30 percent of applied ink jet ink to pass through into said adhesive layer;

printing an image onto said adhesive layer of said image transfer sheet;

inactivating said detackifying layer so that said adhesive is in an exposed tacky state; and adhering the imaged exposed tacky adhesive layer to said substrate by applying the imaged tacky adhesive layer to said substrate.

2. An ink jet printing image transfer method according to claim 1 wherein said adhesive layer is formed of hydrophilic adhesive.

3. An ink jet printing image transfer method according to claim 2 wherein said adhesive layer is formed of a pressure sensitive adhesive.

4. An ink jet printing image transfer method according to claim 1 wherein the adhesive layer is formed of hydrophobic adhesive.

5. An ink jet printing image transfer method according to claim 1 wherein said adhesive layer is detackified by locating an inactivatable ink jet printing ink porous outer layer on the adhesive layer, said outer layer permitting at least 40 percent of the ink from ink jet printers to pass through the porous layer into said adhesive.

6. An ink jet transfer method according to claim 5 including the step of forming said porous outer layer of a water permeable material.

7. An ink jet transfer method according to claim 1 wherein said transfer sheet is formed with a release layer between said detackifying outer layer and said adhesive layer.

8. An ink jet printed image transfer method according to claim 1 wherein said adhesive layer is activated by heat and pressure.

9. An ink jet printed image transfer method according to claim 8 wherein said particles have the same refractive index as the adhesive layer.

10. An ink jet printed image transfer method according to claim 1 wherein said adhesive layer is detackified by locating an ink jet printing ink porous layer over the adhesive layer, said porous layer being formed of finely divided particles uniformly dispersed on said adhesive layer.

11. An ink jet printed image transfer method according to claim 1 wherein said detackifying layer is formed of starch or polyvinyl alcohol.

12. An ink jet printed image transfer method according to claim 1 wherein said adhesive layer is activated to a tacky state by the addition of water.

13. An ink jet printed image transfer method according to claim 1 wherein said flexible base layer is formed of transparent material.

14. An ink jet printed image transfer method according to claim 1 wherein said flexible base layer is formed of opaque material.

15. An ink jet printed image transfer method according to claim 1 wherein there is located between said flexible base layer and said adhesive layer a release layer.

16. An ink jet printed image transfer method according to claim 15 comprising the additional step of removing said flexible base layer from said adhesive layer after adhering said image transfer sheet to a substrate.

17. A method as defined in claim 1 wherein a second detackifying layer is formed between said adhesive layer and said flexible base layer, whereby when said base layer is removed, the remaining image in the adhesive layer is not tacky.

18. An ink jet transfer method according to claim 1 wherein the adhesive is a water activatable adhesive.

19. An ink jet transfer method according to claim 1 wherein the adhesive is a heat activatable adhesive.

20. An ink jet transfer method according to claim 1 wherein the adhesive is already tacky when the step of printing an image onto the adhesive layer begins.

21. An ink jet transfer method according to claim 1 wherein the detackifying layer is a mesh.

22. An ink jet transfer method according to claim 1 wherein the detackifying layer comprises polyvinyl alcohol.

* * * * *